March 17, 1970   A. W. JACOBS   3,501,177
TUBE COUPLING
Filed Oct. 14, 1968
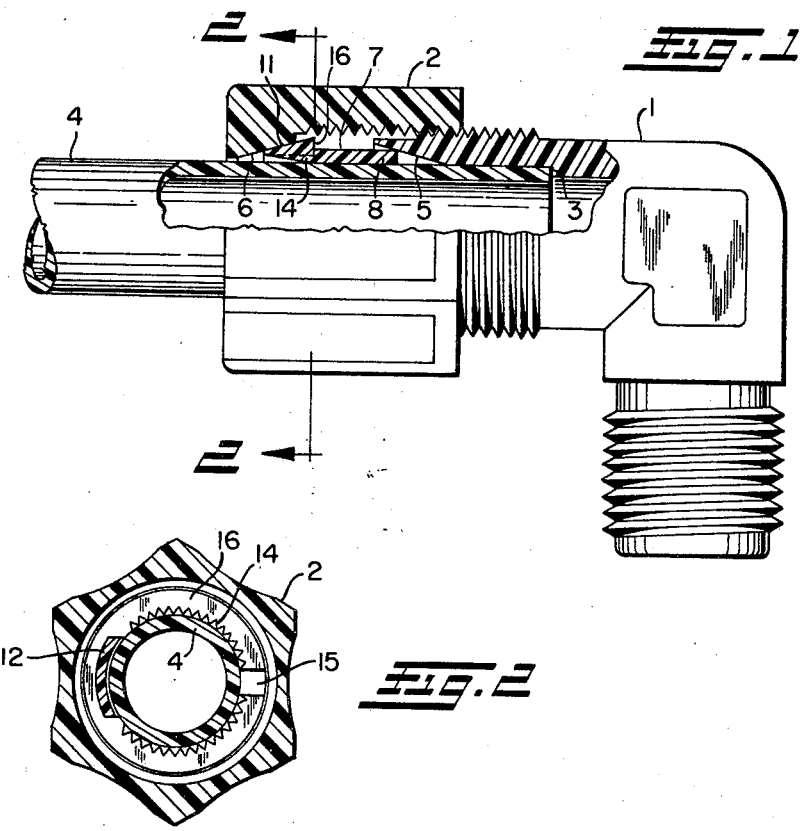
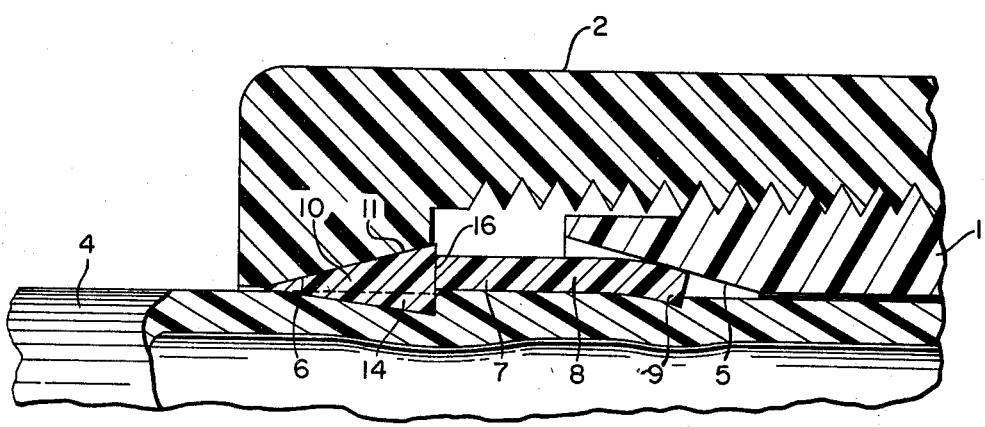
INVENTOR
ARTHUR W. JACOBS
BY
Oberlin, Maky, Donnelly & Renner
ATTORNEYS United States Patent Office 3,501,177
Patented Mar. 17, 1970

3,501,177
TUBE COUPLING
Arthur W. Jacobs, 5994 Columbia Road,
North Olmsted, Ohio
Filed Oct. 14, 1968, Ser. No. 767,404
Int. Cl. F16l 21/06
U.S. Cl. 285—322                                    14 Claims

ABSTRACT OF THE DISCLOSURE

A tube coupling especially for flexible plastic tubing characterized in the provision of a unitary tube gripping and sealing ferrule having tubular and split ring end portions which are adapted to be radially contracted into tube sealing and gripping relation. The invention is further characterized in that the tube coupling body and nut members and the ferrule are molded of plastic material, the ferrule being made of a tough and horny plastic material which is harder than the flexible plastic tubing which is adapted to be gripped thereby.

BACKGROUND OF THE INVENTION

It is of course well known to provide flareless tube couplings employing ferrules which are radially contracted into tube gripping and sealing relation. Couplings of this type generally present no problem of tube blow-off due to high fluid pressure because the tube expands and remains in tight engagement with the ferrule. However, known couplings do not have adequate grip on the tube to resist slippage thereof under conditions of severe mechanical pull on the tube in the absence of fluid expanding pressure. In the case of flexible plastic tubes for example, a severe mechanical pull on the tube with little or no fluid pressure therein will cause necking of the tube and consequent slippage thereof out of the surrounding ferrule.

SUMMARY OF THE INVENTION

With the foregoing in mind it is a principal object of this invention to provide a tube coupling which maintains the grip and seal on the tube at fluid pressures exceeding the bursting pressure of the tube and under pulling forces on the tube approaching or exceeding the tensile strength of the tube.

It is another object of this invention to provide a tube coupling in which the gripping and sealing end portions of the ferrule are successively radially contracted during assembly of the coupling so that the end portion of the tube is axially compressively pre-loaded further to resist slippage where the sealing end portion of the ferrule is in sealed engagement with the tube.

It is another object of this invention to provide a tube coupling in which the gripping end portion of the ferrule is in the form of a readily contractible split ring having axial serrations or teeth on its inner surface which are adapted to be embedded in the surface of the tube and which present transverse V-shaped end faces effectively to resist pull-out of the tube even though the tube may be necked by severe mechanical pull under conditions of little or no fluid pressure within the tube.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

BRIEF DESCRIPTION OF THE DRAWINGS

In said annexed drawing:
FIG. 1 is a partial cross-section view of a tube coupling embodying the present invention, the parts being shown in assembled but untightened condition;
FIG. 2 is a cross-section view taken substantially along the line 2—2, FIG. 1; and
FIG. 3 is a much enlarged fragmentary cross-section view showing the tube coupling in its fully assembled condition with the tube gripped and sealed thereby.

DESCRIPTION OF THE PREFERRED EMBODIMENT

Referring now in detail to the drawing, the coupling herein comprises body and nut members 1 and 2 having screw-threaded engagement with each other and defining therebetween a tube receiving cavity which includes a seat 3 for the end of the tube 4. The body and nut members 1 and 2 are provided with oppositely tapered frusto-conical cam surfaces 5 and 6 for radially contracting the respective end portions of a ferrule 7 which surrounds the tube 4 and which is disposed between said cam surfaces 5 and 6.

The ferrule 7 has a tubular sealing end portion 8 which confronts the body cam surface 5 and which is radially contracted thereby upon axial inward movement of the ferrule 7 with respect to the body member 1. The engagement of the ferrule portion 8 with the cam surface 5 establishes sealed contact therewith and the resulting radial contraction of the ferrule portion 8 establishes sealing and gripping engagement with the tube 4 where the axially inner corner 9 is embedded in the tube 4.

The axially outer end portion of the ferrule 7 is in the form of a split ring 10 having an external frusto-conical surface 11 engageable with the cam surface 6 of the nut member 2, said split grip ring portion 10 of the ferrule being integrally connected at 12 (see FIG. 2) to the tubular portion 8. The grip ring portion 10 has interior axially extending V-shaped serrations or teeth 14, which are of progressively decreasing radial depth in an axial outward direction. The grip ring portion 10 is split to provide a gap 15 opposite the connecting portion 12 for easy radial contraction to cause the teeth 14 to be embedded in the tube 4, the width of the gap 15 preferably being such that when the gap 15 is closed the teeth 14 will be completely embedded in the tube 4 thus to limit the extent of contraction of the grip ring portion 10. The grip ring portion 10 from the connecting portion 12 to the gap 15 has a plane axially inner end face 16 in juxtaposition to the corresponding axially outer end face of the portion 8 of the ferrule 7 so that after the ring portion 10 has been contracted, it will urge the portion 8 axially inwardly without cocking tendency. Furthermore, the end face 16 provides transverse inner ends on the teeth 14 to effectively resist tube pull-out and to axially compress the tube 4 against the seat 3.

When the tube coupling parts 1, 2, and 7 are in the assembled but untightened condition as shown in FIG. 1, the end portions 8 and 10 of the ferrule 7 are in contact with the respective cam surfaces 5 and 6 whereupon the tightening of the nut member 2 will first effect radial contraction of the grip ring portion 10 into firm gripping engagement with the tube 4 as shown in FIG. 3 with the teeth 14 embedded in the tube 4. In the case of couplings for flexible plastic tube 4, such gripping of the tube 4 may be achieved simply by hand-tightening of the nut member 2.

After the group ring portion 10 has been contracted as aforesaid, continued tightening of the nut member 2 will cause axial movement of the ferrule 7 with respect to the body member 1 whereupon the sealing end portion 8 will make sealed engagement with the cam surface 5 and, at the same time, said end portion 8 will be radially contracted into tube-gripping and sealing engagement as shown in FIG. 3. It is to be noted that during the axial inward movement of the ferrule 7 with respect to the body member 1 the portion of the tube 4 between the teeth 14 and the abutment seat 3 will be placed under axial compressive pre-load to enhance the gripping and sealing engagement at the axially inner end portion 8 of the ferrule 7.

If it be attempted to mechanically pull the tube 4 from the coupling assembly under conditions of little or no fluid pressure in the tube 4, it can be seen that the teeth 14 offer great resistance to pull-out even though the tube 4 may be neck down at or adjacent to the gripping end portion 10. Furthermore, because there is no stretching of the tube 4 axially inward of the teeth 14, the severe pull on the tube 4 will not disturb the grip and seal made by the axially inner end portion 8 of the ferrule 7 with the tube 4.

As an illustrative example for coupling a flexible plastic tube 4, the body 1, the nut 2, and the ferrule may be molded of nylon or like tough and horny material which in the case of the ferrule 7 is such that the teeth 14 will be embedded in the tube 4 when the grip ring portion 10 is contracted and such that the inner corner 9 will dig into the tube 4 to make sealed gripping engagement therewith. In said example, the frustoconical surfaces 5, 6, and 11 were of 15° taper (30° included angle) and the radially inner edges of the teeth 14 were of 10° taper (20° included angle) with a depth of about .030" at the face 16.

I, therefore, particularly point out and distinctly claim as my invention:

1. A tube coupling comprising nut and body members in screw threaded engagement with each other defining a tube receiving bore and an annular chamber surrounding a tube adapted to be inserted into such bore, said nut and body members having oppositely tapered cam surfaces constituting the end walls of said chambers; and a tube-embracing ferrule in said chamber having an axially split, radially contractible grip ring in camming engagement with the cam surface in said nut member, and on adjacent radially contractible tubular sealing sleeve in camming engagement with the cam surface in said body member; said ring being connected to said sleeve at a minor portion of its circumference to leave an arcuate portion of said ring free for radial contraction; said ring and sleeve being radially contracted respectively to grip the tube and to make sealed engagement with the cam surface of said body member and with the tube upon screwing together of said nut and body members.

2. The coupling of claim 1 wherein said arcuate portion of said ring and said sleeve have abutting end faces to facilitate radial contraction of said arcuate portion and to bodily move said ferrule axially through the connection between said ring and sleeve and through said abutting faces to effect radial contraction of said sleeve.

3. The coupling of claim 1 wherein said arcuate portion of said ring has internal axially extending teeth which are embedded in the tube when said ring is radially contracted.

4. The coupling of claim 1 wherein the connection between said ring and sleeve is diametrically opposite the axial split of said ring to leave two arcuate portions free for radial contraction.

5. The coupling of claim 1 wherein said body member has an abutment seat for the end of the tube; and wherein the tube is axially compressed against said seat as said sleeve is being radially contracted after said ring has been radially contracted.

6. The coupling of claim 1 wherein the axial split of said ring is closed to limit the degree of radial contraction of said ring whereafter said ferrule is bodily moved axially to radially contract said sleeve upon continued screwing together of said nut and body members after said split has closed.

7. The coupling of claim 1 wherein said tapered cam surfaces have a 15° taper.

8. The coupling of claim 3 wherein said teeth are of V-shaped transverse cross-section and of progressively decreasing radial depth in an axial direction away from said sleeve.

9. The coupling of claim 8 wherein the radially inner edges of said teeth have a 10° taper.

10. A tube coupling comprising nut and body members in screw threaded engagement with each other defining a tube receiving bore and an annular chamber surrounding a tube adapted to be inserted into such bore, said nut and body members having oppositely tapered cam surfaces constituting the end walls of said chamber; and a tube-embracing ferrule in said chamber having an axially split, radially contractible grip ring in camming engagement with the cam surface in said nut member, and an adjacent radially contractible tubular sealing sleeve in camming engagement with the cam surface in said body member; said ring being connected to said sleeve at a minor portion of its circumference to leave an arcuate portion of said ring free for radial contraction; said ring and sleeve being radially contracted respectively to grip the tube and to make sealed engagement with the cam surface of said body member and with the tube upon screwing together of said nut and body members, the connection between said ring and sleeve being diametrically opposite the axial split of said ring to leave two arcuate portions free for radial contraction; said arcuate portions of said ring having internal axially extending teeth which are embedded in the tube when said ring is radially contracted.

11. The coupling of claim 10 wherein said teeth are of V-shaped transverse cross-section and are of progressively decreasing radial depth in an axial direction away from said sleeve.

12. The coupling of claim 11 wherein said arcuate portions and said sleeve have axially abutting plane end faces to facilitate radial contraction of said arcuate portion and to bodily move said ferrule axially through the connection between said ring and sleeve and through said abutting faces to effect radial contraction of said sleeve.

13. The coupling of claim 12 wherein said body member has an abutment seat for the end of the tube against which the tube is axially compressed upon continued screwing together of said nut and body members after said ring has been radially contracted to grip the tube.

14. The coupling of claim 13 wherein the axial split of said ring is closed to limit the degree of radial contraction of said ring whereafter said ferrule is bodily moved axially to radially contract said sleeve upon continued screwing together of said nut and body members after said split has closed.

References Cited

UNITED STATES PATENTS

| | | | |
|---|---|---|---|
| 1,819,651 | 8/1931 | Metcalf | 285—323 |
| 2,585,453 | 2/1952 | Gallagher et al. | 285—341 |
| 2,823,935 | 2/1958 | Wurzburger | 285—382.7 X |
| 3,024,046 | 3/1962 | Frost et al. | 285—419 X |
| 3,265,412 | 8/1966 | Reid et al. | 284—423 X |

FOREIGN PATENTS 251,247 11/1962 Australia.

REINALDO P. MACHADO, Primary Examiner

D. W. AROLAN, Assistant Examiner

U.S. Cl. X.R.

285—341, 382.7, 423